US012470911B2

(12) United States Patent
Verma et al.

(10) Patent No.: US 12,470,911 B2
(45) Date of Patent: Nov. 11, 2025

(54) SYSTEMS AND METHODS FOR REMOTE SIM PROVISIONING WITH CONFIRMATION CODE

(71) Applicant: Verizon Patent and Licensing Inc., Basking Ridge, NJ (US)

(72) Inventors: Tarun Verma, Flemington, NJ (US); Zhongting Shen, Branchburg, NJ (US); Bharadwaj Vemuri, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 554 days.

(21) Appl. No.: 18/056,115

(22) Filed: Nov. 16, 2022

(65) Prior Publication Data

US 2024/0163656 A1    May 16, 2024

(51) Int. Cl.
*H04W 8/18* (2009.01)
*H04W 8/00* (2009.01)
*H04W 60/00* (2009.01)

(52) U.S. Cl.
CPC .......... *H04W 8/183* (2013.01); *H04W 8/005* (2013.01); *H04W 60/00* (2013.01)

(58) Field of Classification Search
CPC ..... H04W 8/183; H04W 8/005; H04W 60/00; H04W 84/042; H04W 8/02; H04W 48/18; H04W 60/04; H04W 8/20; H04W 12/40; H04W 12/35; H04W 4/70; H04L 2101/654; H04B 1/3816
See application file for complete search history.

(56) References Cited

U.S. PATENT DOCUMENTS

| | | | |
|---|---|---|---|
| 2018/0191728 A1* | 7/2018 | Kim ...................... | H04M 15/58 |
| 2022/0386105 A1* | 12/2022 | Jung ..................... | H04W 12/45 |

FOREIGN PATENT DOCUMENTS

WO    WO-2020/205011 A1 * 10/2020 ............ H04W 12/35

* cited by examiner

*Primary Examiner* — Rafael Perez-Gutierrez
*Assistant Examiner* — Sylvester Wilson, Jr.

(57) ABSTRACT

A system and method disclosed provide a subscription management (SM) platform, associated with a mobile network operator (MNO), that may receive from a first user device, over a second network other than the MNO, a discovery message including the device identifier. The first user device may not include a SIM profile activated to provision the MNO. Methods and systems may send, by the SM platform to the first user device over the second network, a confirmation code request message and receive a confirmation code response message indicative of a request to send a stored confirmation code to a second user device. Methods and systems may receive, by the SM platform over the second network, a confirmation code entered by a user, and send the SIM profile associated with the device ID to activate for provisioning the MNO.

20 Claims, 13 Drawing Sheets

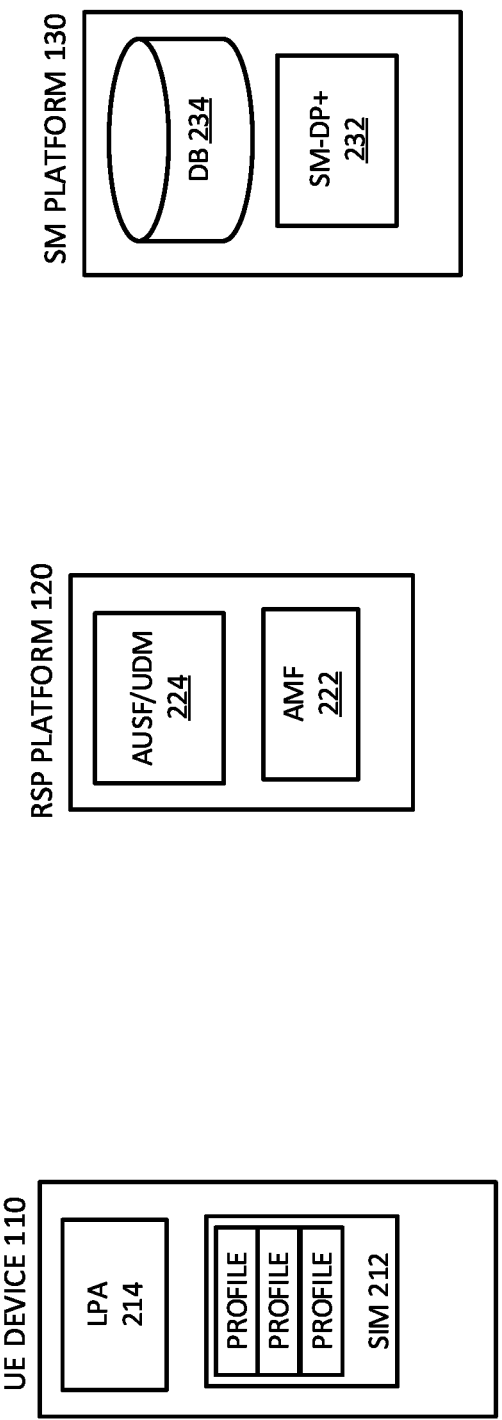

| SIGNAL | DESCRIPTION |
|---|---|
| 501-1 | New Device Order & Activate Later Indicator |
| 501-2 | Warehouse D'Fill & Store Depletion Order |
| 501-3 | Device Info (e.g., IMEI, EID) Scanned |
| 502-1 | eSIM ICCID Assignment w/EID REQUEST |
| 502-2 | eSIM ICCID Reservation w/EID REQUEST |
| 502-3 | ES2+.downloadOrder REQUEST |
| 502-4 | ES2+.downloadOrder RESPONSE |
| 502-5 | eSIM ICCID Reservation w/EID RESPONSE |
| 502-6 | eSIM ICCID Reservation w/EID RESPONSE |
| 503-1 | Finalize eSIM Reservation w/POA+Confirmation Code REQUEST |
| 503-2 | Finalize eSIM Reservation w/POA+Confirmation Code REQUEST |
| 503-3-1 | Request CC by MDN + ICCID |
| 503-3-3 | Response w/assigned Confirmation Code |
| 503-4-1 | Reserve eSIM ICCID for EID w/DS Registration + Confirmation Code |
| 503-4-2 | ES12 Registration [REQUEST & RESPONSE] |

FIG. 6A

| SIGNAL | DESCRIPTION |
|---|---|
| 503-4-3 | Confirm Profile Reservation w/Confirmation Code |
| 503-5 | Finalize eSIM Reservation w/POA+CC RESPONSE |
| 503-6 | Finalize eSIM Reservation w/POA+CC RESPONSE |
| 504-2 | D'Fill Shipment w/ETA & Pickup Confirmation |
| 506-1 | Check for Registered Event for the Device /EID |
| 506-2 | Provide Activation Code w/SM-DP+ Address |
| 507-1 | Authenticate Device w/EID & GSMA Certificate |
| 507-2 | Request Confirmation Code [Provide eSIM Profile Metadata] |
| 508-1 | Request Confirmation Code Delivery |
| 508-2 | Request Confirmation Code Delivery [e.g., Blank Confirmation Code (hash)] |
| 508-3-1 | Blank Confirmation Code Notification |
| 508-3-2 | Trigger to Send Confirmation Code to Customer upon Blank Confirmation Code w/EID+ICCID |
| 508-3-3 | Trigger to Send Confirmation Code to User |
| 508-3-4 | Send Confirmation Code (e.g., SMS, email, push notification) |

FIG. 6B

| SIGNAL | DESCRIPTION |
|---|---|
| 508-3-5 | Receive/Retrieve Confirmation Code |
| 508-4 | Error for Blank Confirmation Code |
| 508-5 | Present Confirmation Code |
| 509-1 | Enter Received Confirmation Code |
| 509-2 | Confirmation Code |
| 509-3-1 | Confirmation Code Success Notification |
| 509-3-2 | Confirmation Code Success Notification to Release Pending Order w/EID+ICCID |
| 509-3-3 | Request Pending Order Release |
| 509-4 | Confirmation Code Success Notification |
| 510-1 | Release Pending |
| 510-2 | Submit Provisioning |
| 510-3 | Provision Wireless Network Elements |
| 511-1 | Initiate eSIM download |
| 511-2 | eSIM Download |
| 511-4 | Initiate Connection to Network |

FIG. 6C

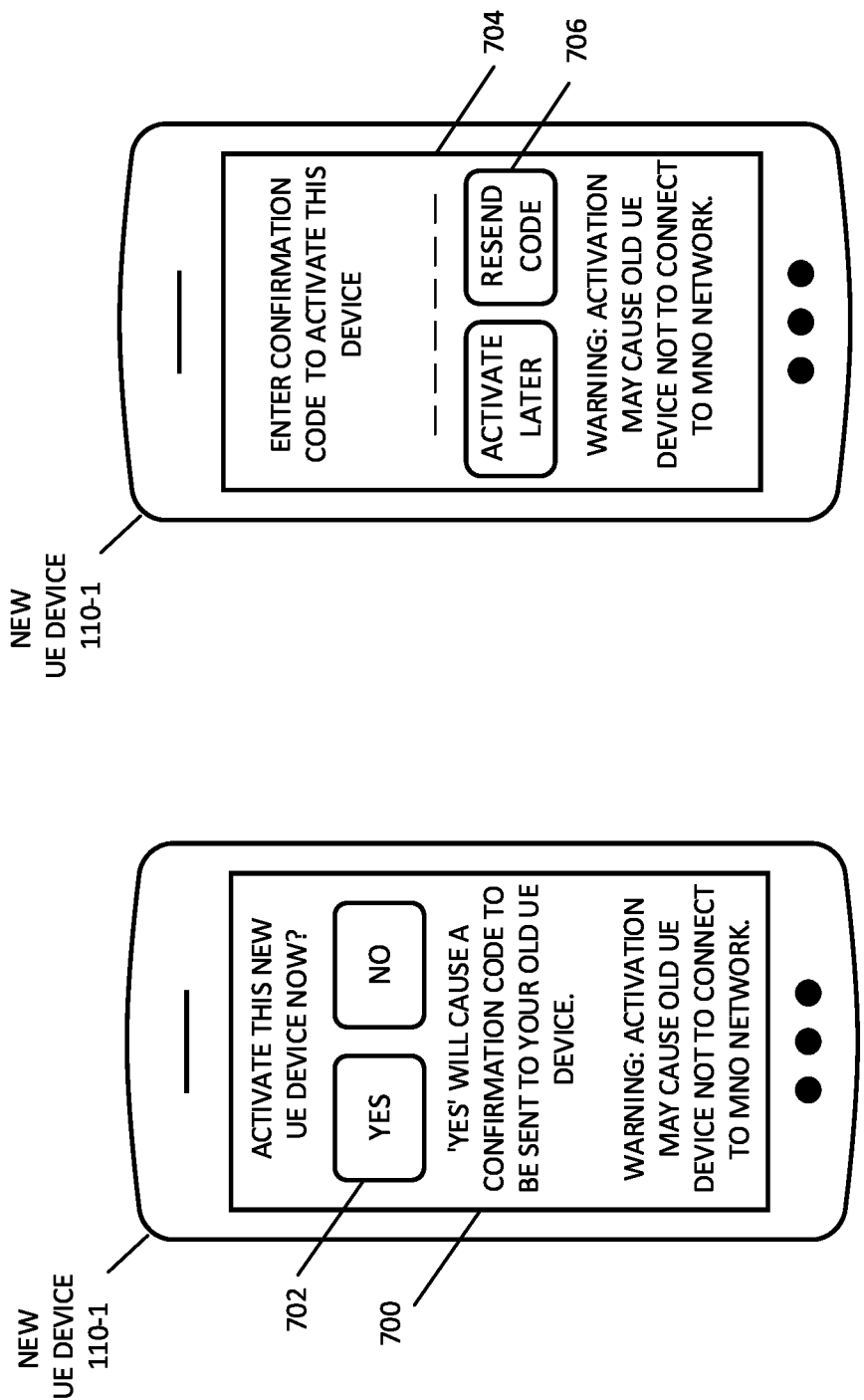

SYSTEMS AND METHODS FOR REMOTE SIM PROVISIONING WITH CONFIRMATION CODE

BACKGROUND INFORMATION

Embedded subscriber identity modules (embedded SIMs or eSIMs) may be a practical alternative to traditional removable SIM cards containing subscription credentials. While providing a comparable level of security with many design advantages over the removable SIM (e.g., being usable in a companion class of devices, such as wearables, etc.), eSIM technology presents a user experience distinct to that of using a SIM card with respect to activating user equipment (UE) devices for use on a mobile network operator (MNO) network. For example, UE device activation may include using eSIM protocols.

BRIEF DESCRIPTION OF THE DRAWINGS

FIGS. 2A-2D are diagrams of exemplary functional components of devices that may be included in the environment shown in FIG. 1;

FIG. 6A-6C are tables listing the exemplary messages illustrated in FIGS. 5A-5C between devices to provision UEs with SIM profiles; and FIGS. 7A-7C are diagrams illustrating exemplary display screens on UE devices.

DETAILED DESCRIPTION

The following detailed description refers to the accompanying drawings. The same reference numbers in different drawings may identify the same or similar elements. Also, the following detailed description does not limit the invention.

The embedded Subscriber Identity Module (eSIM) solution offers Mobile Network Operators (MNOs), User Equipment (UE) device distributors, UE device manufacturers, and UE device users, benefits that may not be provided by other technology (i.e., physical SIM cards). For example, eSIM-enabled devices—e.g., without the SIM card slot—may enable a more compact design and may be available to additional classes of UE devices (e.g., wearables). In addition, UE device supply chain processes may be optimized while reducing customization requirements of UE devices for specific MNOs and/or operating regions. Furthermore, eSIM technology may provide for simplified subscription management, for example, when activating UE devices or changing MNOs.

eSIM technology involves an initial cellular service activation without an active SIM profile. For example, a user may wish to activate a UE device obtained from an MNO, distributor, or retailer and may wish to remotely activate the UE device to enable service on the MNO's cellular network. In order to activate the UE device, the MNO may provision a network service using a designated eSIM profile, which is downloaded to the UE device from a remote provisioning platform and/or system. Provisioning may involve installation of a service provider application on the UE device by using an activation voucher/code (e.g., a quick response (QR) code contained in printed material, shown on a display at a point of sale, attached to an email, etc.) that contains the address (e.g., a fully qualified domain name (FQDN)) of the MNO's remote SIM provisioning system. Alternatively, activation may involve preloading of an MNO-specific application or an MNO-specific entitlement server address on the UE device by the manufacturer. Currently, a high degree of user interaction is required and little to no scalability is possible in the initial connectivity process associated with bulk activation. A confirmation code may be provided to the user when activating a new device, but the user may misplace the confirmation code or not wish to search for it in email or other messaging applications.

Systems and methods described herein may enable SIM provisioning of UE devices with a confirmation code. In one embodiment, the user may request a confirmation code from a provisioning system (e.g., if the user forgets the confirmation code). In another embodiment, the confirmation code may be sent from another device from the provisioning system automatically when the user attempts to activate the device.

Figure 1:
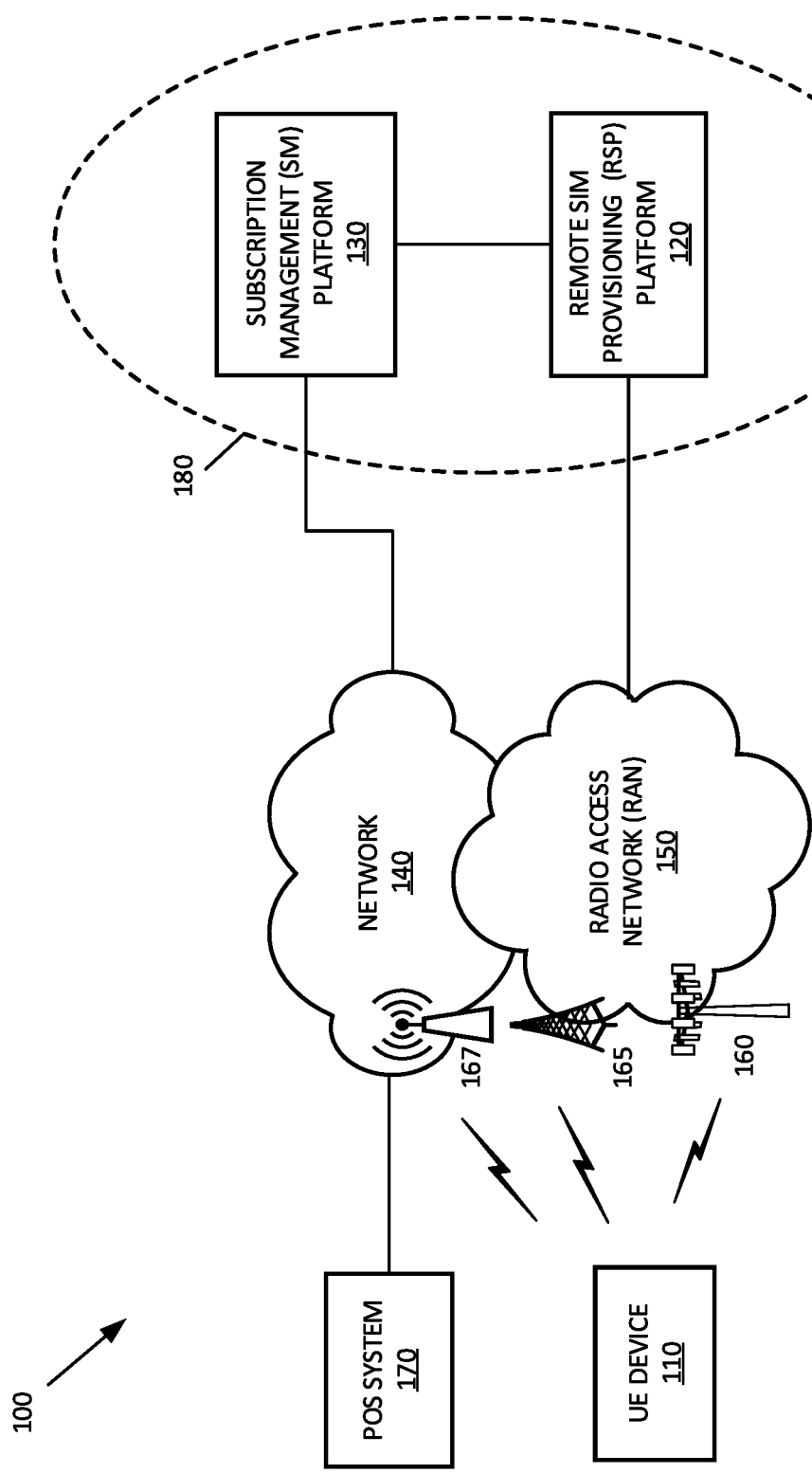
FIG. 1 is a diagram illustrating an exemplary environment in which systems and/or methods described herein may be implemented.

FIG. 1 is a diagram of an exemplary environment 100 in which systems or methods described herein may be implemented. As shown in FIG. 1, environment 100 may include user equipment (UE) device 110, a remote SIM provisioning (RSP) platform 120, a remote Subscription Manager platform (SM platform) 130, a network 140, a radio access network (RAN) 150, and a point-of-sale (POS) system 170 for business to business (B2B) and/or business-to-consumer (B2C) customers. The elements shown within area 180 (i.e., RSP platform 120 and SM platform 130) may be associated with an MNO that provides wireless network services to UE device 110. Some elements, such as SM platform 130 and RSP platform 120 may be interconnected via an internal company network, such as a local area network (LAN) or wide area network (WAN), that includes wired, wireless and/or optical connections between the elements illustrated in FIG. 1. In other implementations, some devices (such as SM platform 130 or RSP platform 120) may be directly or indirectly coupled to each other via an external network, such as network 140 (e.g., the Internet). In some implementations, some devices (such as SM platform 130 or RSP platform 120) may be coupled to a core network associated with an MNO.

UE device 110 may include any device with wireless communication functionality (e.g., cellular or mobile wireless network). For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable or stationary computer; an automobile or vehicle; a desktop computer; a customer premises equipment (CPE) device, such as a set-top box or a digital media player (e.g., Apple TV, Google Chromecast, or Amazon Fire TV), a WiFi access point, a small cell device, a smart television; a portable gaming system; a global positioning system (GPS) device; a home appliance device; a home monitoring device; an Internet of things (IoT) device; a sensor device; and/or any other type of computer device with wireless communication capabilities. UE device 110 may include capabilities for voice communication, mobile broadband services (e.g., video streaming, real-time gaming, premium Internet access etc.), best effort data traffic, and/or other types of applications. UE device 110 may also be referred to as a user device, a mobile device, or an SIM-enabled device.

Figure 2D:
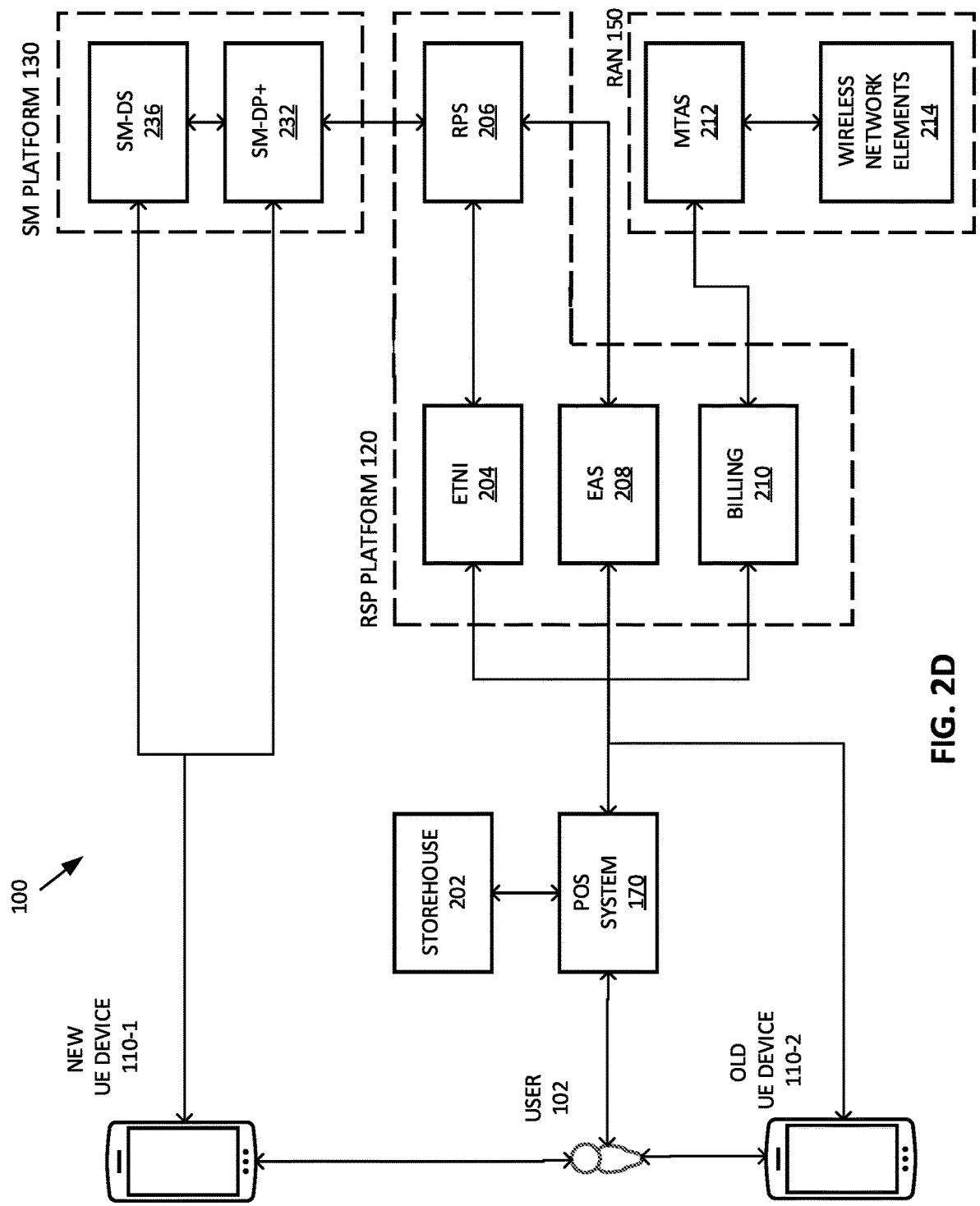

UE device 110, RSP platform 120, and SM platform 130 are described with respect to FIGS. 2A-2D, which are diagrams of exemplary functional components of these devices. Referring to FIG. 2A, UE device 110 may include a SIM 212. SIM 212 may be implemented as an embedded SIM, e.g, an embedded universal integrated circuit card (eUICC) that enables UE device 110 to wirelessly access RAN 150. In some embodiments, SIM 212 may include an embedded secure element (SE). SIM 212 may be directly embedded into UE device 110. SIM 212 may store Integrated Circuit Card Identifiers (ICCIDs) that are associated with profiles. A Profile comprises MNO-related information and information related to subscription to MNO services, including the MNO's credentials and potentially operator or third-party SIM-based applications. As described herein, profiles may be downloaded and stored in SIM 212. The content and structure for profiles stored in SIM 212 may be similar to those installed on traditional SIMs. The description of these profiles is defined by the SIMAlliance. The profile may also store subscriber data, such as a user's subscription credentials, network settings, and/or SIM-based applications. The information stored in a profile may enable UE device 110 and/or the user to connect to RAN 150.

UE device 110 may include a local profile assistant (LPA) 214. LPA 214 may include logic associated with interfacing with SIM 212 to activate UE device 110. LPA 214 may interface with SM platform 130 and/or RSP platform 120 to download and/or activate ICCIDs to SIM 212. In some embodiments, LPA 214 may provide a user interface for managing the status of SIM profiles.

As shown in FIG. 2B, RSP platform 120 may include one or more computing devices or systems, for example, of a backhaul network, which provide for remote provisioning of ICCIDs to UEs 110. For example, RSP 220 may include billing-related systems/databases, an electronic telephone number inventory (ETNI), a mobile terminating access service (MTAS), etc. RSP platform 120 may include an Access and Mobility Management Function (AMF) that receives connection and session related information from UE device 110 and may be configured to handle connection and mobility management tasks via a New Radio (NR) 5G wireless access network. Alternatively, in a Long Term Evolution (LTE) access network, RSP platform 120 may include a Mobility Management Entity (MME). RSP platform 120 may further include an Authentication Server Function (AUSF) that authenticates servers and provides encryption keys and a Unified Data Management (UDM) function 224 that stores and manages data received via the NR 5G RAN. Alternatively, RSP platform 120 may include a Home Subscriber Server (HSS) that is configured to communicate with the an LTE access network and provide subscriber profile and authentication information, and/or be configured to store information about subscribers to enable authorization, details of devices, as well as the user's location and service information. RSP platform 120 may act as an interface between SM platform 130 and LPA 214 of UE device 110 to provision an ICCID with a new service or download an ICCID to SIM 212, as further described below.

Referring to FIG. 2C, SM platform 130 may include one or more computing devices or systems that act as a backend for a wireless network. RSP platform 120 may include a subscription manager—data preparation (SM-DP+) device 232 (also referred to as SM-DP+ 232) that operates as an SIM subscription management server associated with a wireless MNO network. For example, SM-DP+ device 232 may be configured for creation, download, remote management (e.g., enable, disable, update, delete), and/or the protection of MNO credentials (e.g., the SIM profile). SM platform 130 may include a database (DB) 234 that is configured to store records of SIM profiles associated with UEs 110. In one embodiment, SM platform 130 may include one or more devices that operate as a mobile device management (MDM) server associated with a wireless MNO network. SM platform 130 may interact with RSP platform 120 to facilitate activation of UE device 110, as further described below.

Referring again to FIG. 1, network 140 may include one or more wired, wireless, and/or optical networks that are capable of receiving and transmitting data, voice, and/or video signals. For example, network 140 may include one or more public switched telephone networks (PSTNs) or other type of switched network. Network 140 may also include one or more wireless networks and may include a number of transmission towers for receiving wireless signals and forwarding the wireless signals toward the intended destination. Network 140 may further include one or more satellite networks, one or more packet switched networks, such as an Internet protocol (IP) based network, a LAN, a WAN, a personal area network (PAN), a WiFi network, a Bluetooth network, an intranet, the Internet, or another type of network that is capable of transmitting data. Network 140 provides wireless packet-switched services and wireless Internet protocol (IP) connectivity to UE devices 110 to provide, for example, data, voice, and/or multimedia services. In one embodiment, network 140 may include a WiFi access point 167 that allows devices, such as UE device 110, to communicate wirelessly through network 140. Access point 167 may include a device with a transceiver configured to communicate with other devices 140 using wireless signals based on the Institute of Electrical and Electronics Engineers (IEEE) 802.11 standards for implementing a wireless LAN network.

RAN 150 may provide an air interface to network 140 for wireless devices, such as UE device 110. RAN 150 may enable UE device 110 to connect to network 140 for mobile telephone service, Short Message Service (SMS) message service, Multimedia Message Service (MMS) message service, Internet access, cloud computing, and/or other types of data services. For example, RAN 150 may establish an Internet Protocol (IP) connection between UE device 110 and network 140.

RAN 150 may include a 5G access network or other advanced networks (e.g., 6G, 7G, etc.). In some implementations, RAN 150 may include a Long Term Evolution (LTE) access network and/or an LTE Advanced (LTE-A) access network. In other implementations, RAN 150 may include a Code Division Multiple Access (CDMA) access network. For example, the CDMA access network may include a CDMA enhanced High Rate Packet Data (eHRPD) network (which may provide access to an LTE access network). As described herein, RAN 150 may include a 5G base station 160 (e.g., a next generation Node B (gNB)) and/or a 4G base station 165 (e.g., an evolved Node B (eNB)). 5G base station 160 and/or 4G base station 165 may each include one or multiple cells that include devices and/or components configured to enable radio communication with UE device 110.

POS system 170 may include a system for interacting with a user related to ordering or acquiring UE device 110.

In one implementation, POS system 170 may be associated with an MNO, an original equipment manufacturer (OEM), a distributor, an online retailer, a brick and mortar establishment, etc., from which the user obtains UE device 110 and/or a subscription to a mobile network service for UE device 110. In one implementation, POS system 170 may provide information such as user data, subscription data, wireless network service data, MNO credentials, or other information to SM platform 130, for example, for use in configuring an SIM profile for activating UE device 110. In one embodiment POS system 170 may provide a web portal to service customers. In another embodiment, POS system 170 may provide an online store which a customer may visit.

FIG. 2D is a more detailed description of the devices and arrangement of devices in environment 100 in which systems or methods described herein may be implemented. As shown in FIG. 2D, environment 100 may also include storehouse 202, and two user devices 110: a new UE device 110-1 (e.g., a first user device) and an old UE device 110-2 (e.g., another or a second user device). RSM platform 130 may also include a Subscription Manager-Discovery Server (SM-DS) 236. RSP platform 120 may also include an electronic telephone number inventory (ETNI) 204, a remote provisioning system (RPS) 206, enterprise activation services (EAS) 208, and a billing system 210. RAN 150 may include mobile terminating access service (MTAS) 212 and wireless network elements 214.

ETNI 204 may request ICCID assignments from RPS 206 and request finalization of eSIM reservations from RPS 206. RPS 206 may exchange messages with SM platform 130 to reserve ICCIDs, send eSIM profiles, and confirmation codes. EAS 208 assigns confirmation codes and sends confirmation codes to other devices in environment 100. Billing system 210 allows for provisioning in RAN 150 when user 102 has paid for services. MTAS 216 and wireless network elements 218 form RAN 150.

In the examples described below, user 102 orders new UE device 110-1 from POS system 170 to replace old UE device 110-2. When user 102 receives new UE device 110-1, user 102 powers on new UE device 110-1 to activate the device. In one embodiment, when new UE device 110-1 is powered on, user 102 may request that a confirmation code be sent to a second device (e.g., old UE device 110-2) for activation of new UE device 110-1.

The number and arrangement devices and/or networks, illustrated in FIGS. 1 and 2A-2D, are provided for explanatory purposes. In practice, additional devices and/or networks, fewer devices and/or networks, different devices and/or networks, or differently arranged devices and/or networks than those illustrated may be used. In some implementations, one or more of the components or networks may perform one or more functions described as being performed by another one or more of the other components or networks. The components and networks shown may interconnect via wired connections, wireless connections, or a combination of wired and wireless connections.

Figure 3:
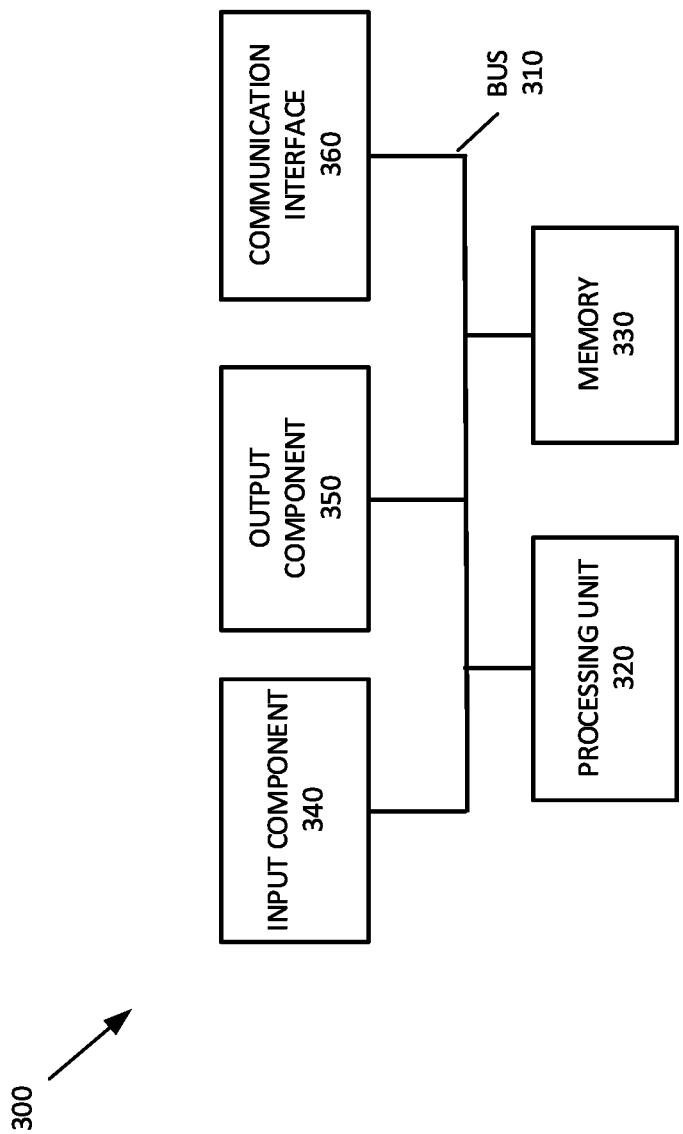
FIG. 3 is a diagram of exemplary components of a device that may be included in the environment shown in FIG. 1.

FIG. 3 is a diagram of exemplary components of a computing module 300 (e.g., a computer). The components may correspond to one of the components of any device in environment 100 (e.g., UE device 110, LPA 114, RSP platform 120, SM platform 130, SM-DP+ 232, and/or POS system 170). As illustrated, computing module 300 may include a bus 310, a processing unit 320, a memory 330, an input component 340, an output component 350, and a communication interface 360.

Bus 310 may permit communication among the components of computing module 300. Processor 320 may include one or more processors or microprocessors that interpret and execute instructions. Additionally, or alternatively, processing unit 320 may be implemented as or include one or more application specific integrated circuits (ASICs), field programmable gate arrays (FPGAs), or the like. Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input component 340 may include a device that permits an operator to input information to computing module 300, such as a button, a switch, a keyboard, a keypad, a mouse, a microphone or the like. Output component 350 may include a device that outputs information to the operator, such as a display (e.g., a liquid crystal display), a printer, a speaker, a light emitting diode (LED), etc.

Communication interface 360 may include one or more transceivers that enables computing module 300 to communicate with other devices and/or systems. For example, communication interface 360 may include one or more radio frequency (RF) receivers, transmitters, and/or transceivers and or more antennas for transmitting and receiving data. Communication interface 360 may also include a modem or Ethernet interface to a LAN or other mechanism for communicating with other devices. For example, communication interface 360 may include a wireless network interface (e.g., a WiFi) card for wireless communications. Communication interface 360 may also include a universal serial bus (USB) port for communications over a cable, a Bluetooth™ wireless interface, and/or a near-field communications (NFC) wireless interface. Communication interface 360 may include radios for commuting with network 140 and/or RAN 150 (e.g., a 5G and/or 4G base station).

As described herein, computing module 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of computing module 300, in other implementations, computing module 300 may contain fewer components, different components, differently arranged components, or additional components than depicted in FIG. 3. Alternatively, or additionally, one or more components of computing module 300 may perform one or more tasks described as being performed by one or more other components of computing module 300.

Figure 4:
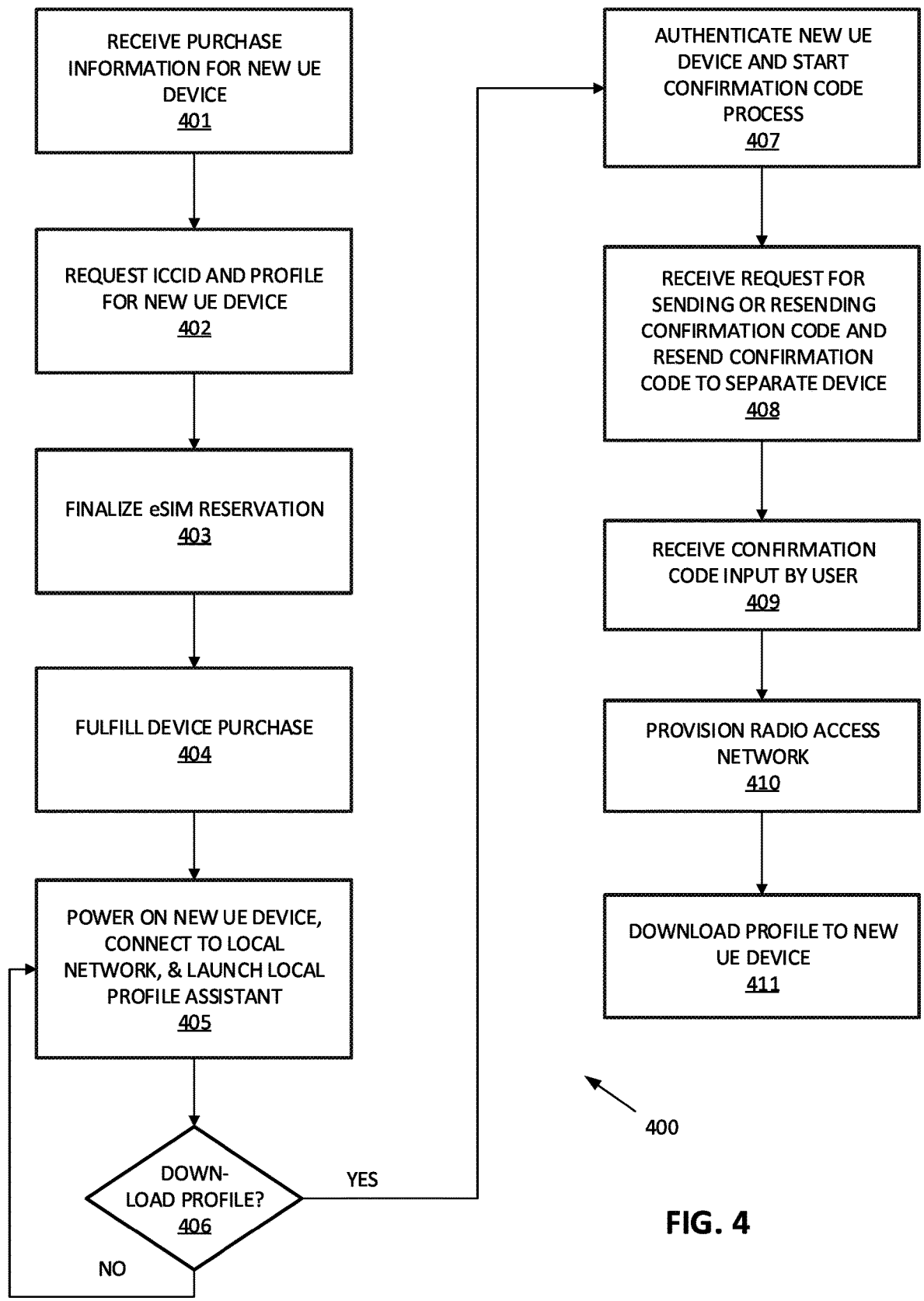
FIG. 4 is a flowchart of an exemplary process in which an SIM profile may be provisioned.
Figure 5A:
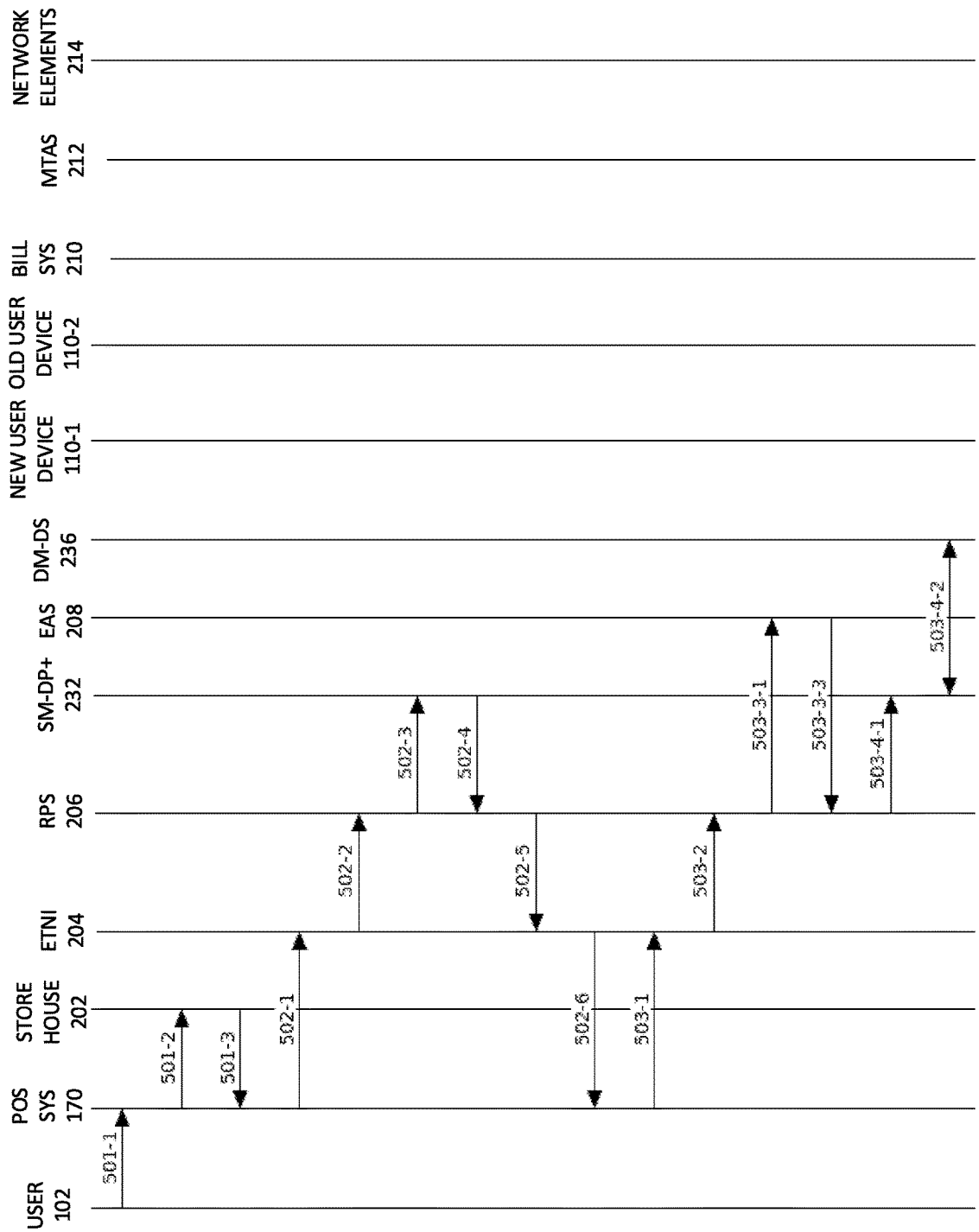
FIG. 5A-5C are diagrams illustrating exemplary operations and messaging between devices to provision User Equipment (UE) devices with Subscriber Identity Module (SIM) profiles.
Figure 5B:
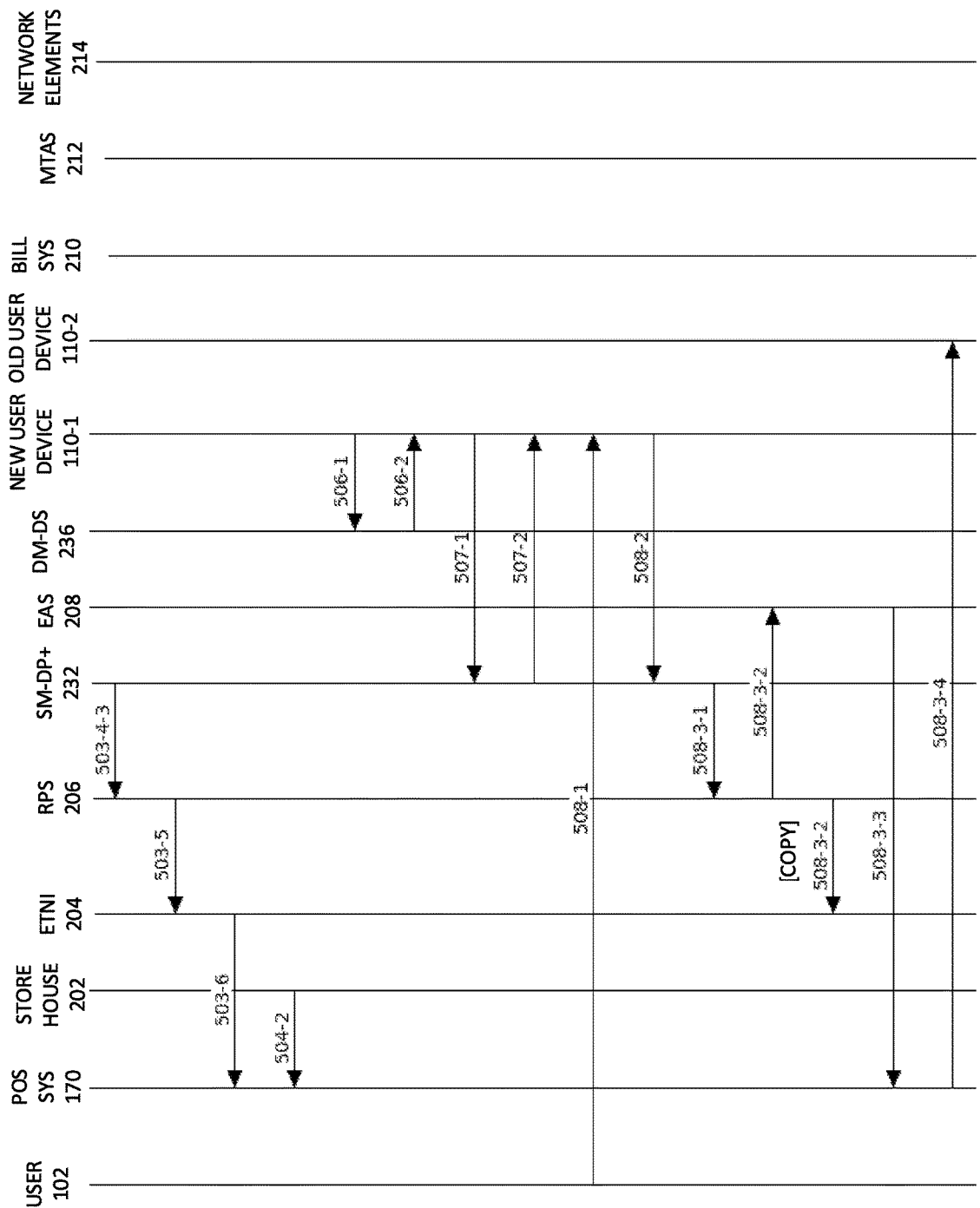
Figure 5C:
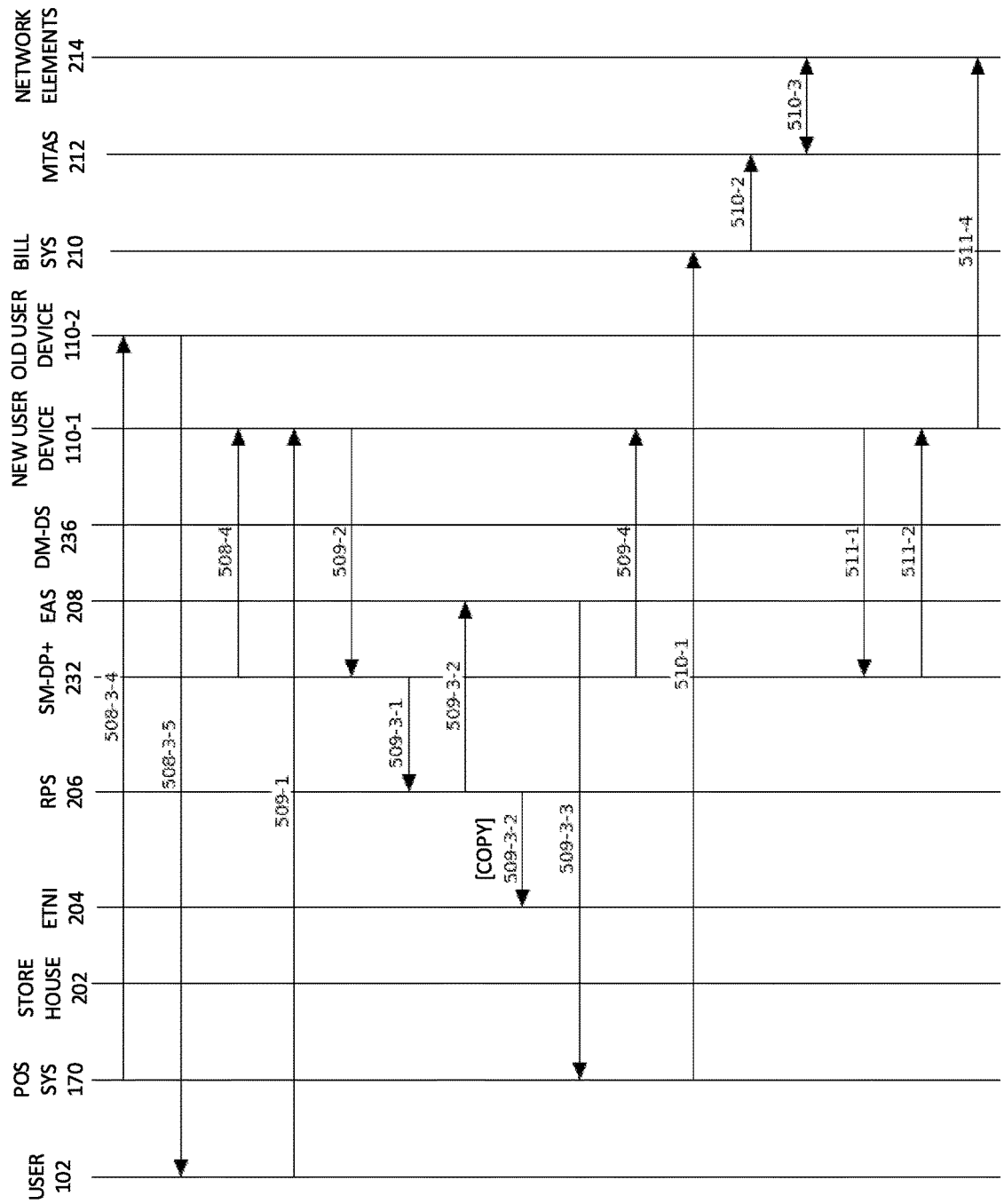

FIG. 4 illustrates an exemplary remote SIM provisioning process 400 for UE device 110. Method 400 may be performed by components of UE device 110, RSP platform 120, SM platform 130, and/or other network devices described herein. Process 400 is described in conjunction with FIGS. 5A-5C. FIG. 5A-5C are diagrams illustrating exemplary operations of and messaging between devices in environment 100 to provision UEs with SIM profiles. Devices in environment 100 may perform process 400 by executing instructions stored in memory 330 and executed by processor 320.

Remote SIM provisioning process 400 may begin with a contract subscription process with the receipt of purchase information from a user 102 for new UE device 110-1 through a web-based interface (block 401). The web-based interface may be provided by POS system 170, for example. POS system 170 receives the identity of user 102 (e.g., user 102 may log into an account) including the name, address, account number, credit card information, and/or phone number of user 102. User 102 may then use old UE device 110-2 to browse and select a phone to purchase. POS system 170 receives the selection 501-1 of a phone for purchase (e.g., new UE device 110-1). In this example, user 102 wants to wait to provision or activate the eSIM in new UE device 110-1. That is, user 102 does not wish to provision or activate the eSIM until user 102 receives new UE device 110-1 (e.g., when user 102 is ready to transition from old UE device 110-2 to new UE device 110-1). As such, POS system 170 receives an indication 501-1 from user 102 that user 102 wishes to use the "activate later" option (as opposed to an "activate now" option).

Process 400 continues with a store depletion order 501-2 to identify and track inventory for satisfying the order by user 102. As part of this, process 400 determines (e.g., scans) an identifier associated with new UE device 110-1 (e.g., a unique identifier or device ID), such as an EID and/or IMEI of new UE device 110-1. In one embodiment, POS system 170 receives the device information 501-3 (e.g., EID and/or IMEI) associated with new UE device 110-1 from storehouse 202.

Process 400 may continue with a request for an ICCID reservation from RSP platform 120 to SM platform 130 for an EID (block 402). In the current example, POS system 170 may have received (e.g., from storehouse 202) the EID associated with the new UE device 110-1, may query a database of associations between IMEI and EID, and/or may assign an EID and associate it with the IMEI. POS system 170 may send a request 502-1 for an ICCID to ETNI 204, which passes request 502-2 to RPS 206. Requests 502-1 and 502-2 may include the identity of new UE device 110-1, such as the EID. Requests 502-1 and 502-2 are the start of a process to download a profile to new UE device 110-1 associated with the account of user 102. In one embodiment, RSP platform 120 (e.g., ETNI 204 and/or RPS 206) may generate a profile and/or ICCID to associate with the EID.

RPS 206 sends a request 502-3 to SM-DP+ 232 as part of a download preparation process. The request from RPS 206 to SM-DP+ 232 may include the EID of UE device 110-1, a profile type, and/or the ICCID. In one embodiment, SM-DP+ 232 may verify the compatibility between the eUICC of the device associated with the EID and/or the requested profile type. In one embodiment, SM-DP+ 232 generates the ICCID if one is not provided by RPS 206 in request 502-3. SM-DP+ 232 reserves the ICCID for the request associated with the EID and SM-DP+ 232 sends a response 502-4 with an acknowledgement, which may include the ICCID if provided by RPS 206. RPS 206 may send a response 502-5 to ETNI 204 indicating that the ICCID was reserved and associated with the EID of UE device 110-1 and, likewise, ETNI 204 may send a response 502-6 to POS system 170 indicating the same.

Process 400 may continue with sending a request by RSP platform 120 to SM platform 130 to finalize the eSIM reservation with power-on-activation, activate later, and/or provide a confirmation code request (block 403). In the current example, POS system 170 sends a request 503-1 to ETNI 204 with the identity of new UE device 110-1 (e.g., EID, IMEI, and/or ICCID), an indication of a power-on-activation (e.g., including activate later), and/or a request for a confirmation code. ETNI 204 may pass this request 503-2 to RPS 206. Requests 503-1 and/or 503-2 may include a request for "activate later" and/or a "power-on activation." In one embodiment, "power-on activation" is an indication of "activate later" or vice versa. RPS 206 may then send a request 503-3-1 to EAS 208 for a confirmation code. Request 503-3-1 may include the identity of UE device 110-1 and/or user 102, such as the mobile device number (MDN), ICCID, EID, and/or IMEI, for example.

EAS 208 may determine a confirmation code. The confirmation code may include one-time code based on the current time, a nonce, MDN, ICCID, EID, and/or IMEI. EAS 208 may send a response 503-3-3 to RPS 206 with the assigned confirmation code. RPS 206 may then send a message 503-4-1 to SM-DP+ 232 to reserve the ICCID associated with the EID with the confirmation code and registration information for the discovery server. Message 503-4-1 may include the profile associated with the EID (e.g., user 102) for downloading to new UE device 110-1. SM-DP+ 232 stores the profile and associates it with the EID and ICCID.

SM-DP+ 232 and SM-DS 236 may then exchange registration request and response messages 503-4-2. That is, SM-DP+ 232 sends a registration request message to SM-DS 236 and SM-DP+ 232 receives a registration response message response back. The messages between SM-DP+ 232 and SM-DS 236 allow for the discovery server (e.g., SM-DS 236) to be discovered by UE device 110-1 (e.g., using a URI) and, thus, for SM-DS 236 to respond to UE device 110-1 when UE device 110-1 is powered on for activation. SM-DP+ 232 may send confirmation message 503-4-3 to RPS 206 to confirm that the profile reservation has been made. Message 503-4-3 may include the confirmation code.

RPS 206 may then send a message 503-5 to ETNI 204 as a response to message 503-3 to finalize the eSIM reservation with power-on-activation/activate later and confirmation code. Likewise, ETNI 204 may then send a message 503-6 to POS system 170 in response to message 503-1 to finalize the eSIM reservation with power-on-activation and confirmation code (block 403). In one embodiment, message 503-3 may include the confirmation code and the confirmation code may be sent to user 102 through the web portal, email, or text message (e.g., to UE device 110-1). In one embodiment, the confirmation code is additionally or alternatively sent to user 102 again at a later time (e.g., when user 102 powers on or otherwise desires to activate new UE device 110-1).

Process 400 may continue with the completion of the purchase of new UE device 110-1 (block 404) (e.g., to record fulfillment). In one embodiment, the purchase may be paused or not be completed until the credit card or other payment method associated with user 102 is validated. When the payment method is validated, POS system 170 may send a message 504-2 to storehouse 202 to release and/or ship new UE device 110-1 to user 102. In another embodiment, user 102 may pick up UE device 110-1 at storehouse 202. Storehouse 202 may then send a message 504-2 to POS system 170 when user 102 picks up or receives UE device 110-1.

Process 400 continues with the powering on of new UE device 110, connecting to a local network and launching the local profile assistant (block 405). User 102 receives and powers on new UE device 110-1. Process 400 may include determining that no active SIM profile is available on UE device 110 (e.g., no SIM profile or active SIM profile associated with the wireless network of the MNO). For example, UE device 110-1 may determine that no ICCID is active in SIM 212 and may launch an activation application (e.g., LPA 214). UE device 110-1 may launch LPA 214, user 102 may launch the application immediately, or user 102 may launch the application at a later time when ready to activate new UE device 110-1. In one embodiment, LPA 214 may prompt user 102 to connect UE device 110-1 to a network (e.g., the Internet) other than RAN 150, such as a local WiFi network in the customer premises of user 102.

Process 400 may continue with the determination of whether there is a profile waiting for new UE device 110-1 (block 406). If LPA 214 determines a profile may be downloaded, UE device 110-1 sends a request 506-1 to SM-DS 236 (e.g., a discovery message) at the address of SM-DS 236 (e.g., specified in a URI that is stored in UE device 110-1 before shipment). In one embodiment, the address of SM-DS 236 may be specified by user 102 typing in a URI or scanning a URI provided, for example, by POS system 170. Message 506-1 may include the EID of UE device 110-1 (e.g., a device ID). SM-DS 236 may check for a registered event for UE device 110-1 that is associated with the EID. If there is an associated event with the EID (e.g., a new profile), SM-DS 236 may send a message 506-2 to UE device 110-1 with a request for UE device 110-1 to provide an activation code. Message 506-2 may also include the address (e.g., a URI) of SM-DP+ 232. In one embodiment, the activation code associated with UE device 110-1 (e.g., the stored activation code) is stored in UE device 110-1 at storehouse 202 before purchase by user 102. In another embodiment, the activation code is provided to user 102 when the UE device 110-1 is purchased at POS system 170 (e.g., the activation code may be printed on instructions sent with UE device 110-1). In yet another embodiment, the activation code may be in message 506-2 sent from SM-DS 236 to new UE device 110-1.

Process 400 may continue with new UE device 110-1 authenticating to SM-DP+ 232 and starting the confirmation code process (block 407). In one embodiment, before sending the confirmation code, UE device 110-1 may send a message 507-1 to SM-DP+ 232 for authenticating UE device 110-1 (e.g., directed at the address provided by SM-DS 236 in message 506-2) to SM-DP+ 232. Message 507-1 may include the EID (e.g., a device ID), a GSM Association (GSMA) certificate, and/or the activation code. In one embodiment, user 102 is prompted to enter the activation code into new UE device 110-1. In this embodiment, the activation code may have been sent to the user in an email or with the packaging of new UE device 110-1, for example. In another embodiment, the activation code is stored in memory 330 of new UE device 110-1 when in storehouse 202. In this embodiment, the activation code may be automatically entered by LPA 214 after extracting it from message 506-2 or from memory 330 of UE device 110-1. In one embodiment, if new UE device 110-1 is authenticated, SM-DP+ 232 may send a request 507-2 to UE device 110-1 requesting the confirmation code from new UE device 110-1 (e.g., to be entered by user 102). Request 507-2 may include an eSIM profile metadata.

In one embodiment, user 102 and/or UE device 110-1 requests that SM platform 130 send (or resend) the confirmation code for activating new UE device 110-1 (block 408). In this embodiment, instead of asking user 102 for a confirmation code, request 507-2 from SM-DP+ 232 may cause UE device 110-1 (e.g., LPA 214) to present a screen to user 102 requesting whether user 102 is ready to activate new UE device 110-1 (e.g., as part of the "activate later" option). That is, as shown in FIG. 7A, a dialog may be presented to user 102 on new UE device 110-1 asking whether user 102 is ready to activate new UE device 110-1. In this embodiment, UE device 110-1 may suppress a screen that prompts user 102 to input an activation code (e.g., until user 102 selects to activate new UE device 110-1). User 102 may not be ready to activate UE device 110-1, for example, if user 102 wishes to continue to use UE device 110-1 until a later time. In one embodiment, information in request 507-2 may include information indicating that new UE device 110-1 is associated with a "send confirmation code" option (e.g., the activate later option) and that new UE device 110-1 should present to user 102 the option to activate or not, as shown in FIG. 7A. In another embodiment, information indicating that new UE device 110-1 is associated with these options may be stored in memory 330 of UE device 110-1 (e.g., associated with LPA 214). In yet another embodiment, the option to activate later is presented to the user by default or automatically.

As noted, request 507-2 may cause new UE device 110-1 to ask user 102 if user 102 is ready to activate. In another embodiment, as shown in FIG. 7B, UE device 110-1 asks user 102 for a confirmation code as well as prompting user 102 regarding whether user 102 wishes to activate later. If UE device 110-1 receives an input from user 102 to send the confirmation code, then process 400 continues.

If user 102 is ready to activate, then user 102 may press a button on the screen of new UE device 110-1 to receive a confirmation code (e.g., a stored confirmation code) for activating new UE device 110-1. That is, new UE device 110-1 may receive an input from user 102 for requesting the stored confirmation code to be sent and/or resent to user 102. For example, user 102 may touch the "YES" button 702 (as shown in FIG. 7A) or may touch the "resend code" button 706 (as shown in FIG. 7B). When UE device 110-1 receives such a button press to resend a confirmation code, for example, then LPA 214 in new UE device 110-1 may send a request 508-2 to SM-DP+ 232 requesting the delivery (or redelivery) of the confirmation code (e.g., a request to send the stored confirmation code to old UE device 110-2). In one embodiment, request 508-2 may take the form of or include a blank confirmation code, a null confirmation code, or a static confirmation code (e.g., a predefined different confirmation code known to SM-DP+ 232) to indicate to send a message to a different device associated with user 102 (e.g., old UE device 110-2) with the stored confirmation code (e.g., the correct confirmation code). In one embodiment, request 508-2 includes a hash of the confirmation code, another value indicative of the confirmation code, or a value indicative of a request to send or resend the confirmation code. For example, instead of sending the confirmation itself, new UE device 110-1 may send a blank and/or static confirmation code in the message intended to indicate a request to send and/or resent the stored confirmation code. As such, this embodiment may enable sending of an indication from new UE device 110-1 to SM-DP+ 232 without an additional message definition. In one embodiment, request 508-2 may take place through the ES9+ message interface between SM-DP+ 232 and LPA 214 as specified in the GSMA RSP Technical Specification, Version 2.2 of Sep. 1, 2017, for example. Additionally or alternatively, request 508-2 may be carried through an application program interface (API) between new UE device 110-1 and SM-DP+ 232. Additionally or alternatively, request 508-2 may be carried through the API from new UE device 110-1 to RSP platform 120, POS 170, and/or storehouse 202.

Figure 7C:
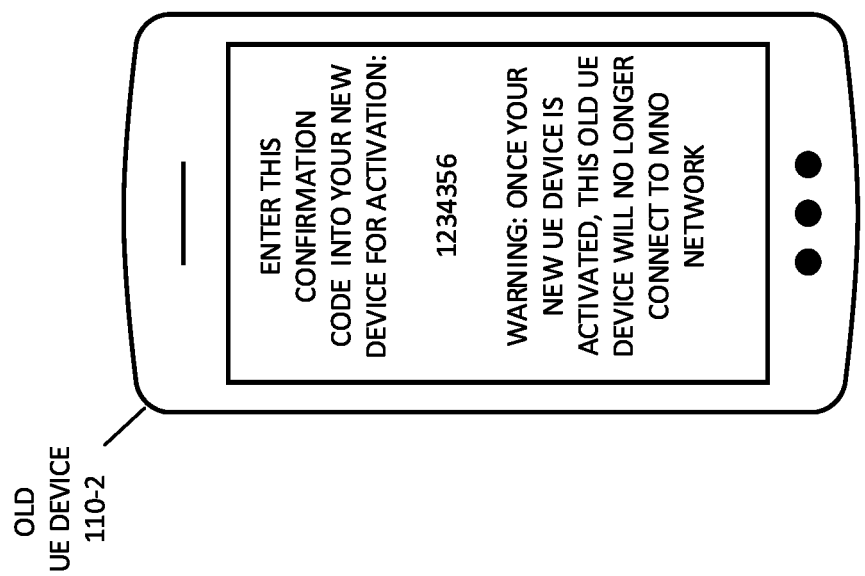

SM-DP+ 232 may inspect the request for confirmation code and determine that it includes the indication for the request. As noted above, the indication may include a blank confirmation code, a null confirmation code, or a static confirmation code (e.g., a different confirmation code known to SM-DP+232) to indicate the request. In this case, SM-DP+ 232 sends a notification 508-3-1 to RPS 206 indicating that SM-DP+ 232 received message 508-2 from new UE device 110-1 with the indication of the request. In one embodiment, SM-DP+ 232 may send notification 508-3-1 reporting that a blank and/or static confirmation code was received. In one embodiment, request 508-3-1 may include an error message indicating that the received confirmation code did not match the stored confirmation code. In one embodiment, although request 508-2 does not include the correct confirmation code (e.g., one that matches the stored confirmation code), RSP platform 120 and/or SM platform 130 does not increment the counter for (or suppresses the counting of) the number of incorrect confirmation codes received by SM platform 130. In turn, RPS 206 sends a message 508-3-2 to EAS 208 and EAS 208 passes message 508-3-3 to POS system 170. Message 508-3-3 triggers POS system 170 and/or RSP platform 120 to send a SMS/text message, email, or other push notification 508-3-4 to old UE device 110-2. Notification 508-3-4 may include the correct or stored confirmation code. POS system 170, RSP Platform 120, and or SM platform 130 may store the correct (e.g., stored) confirmation code in any device therein. Upon receipt of notification 508-3-4, user 102 may read the confirmation code from old UE device 110-2 and enter the confirmation code into new UE device 110-1. As shown in FIG. 7C, old UE device 110-2 displays the confirmation code for the user to read and enter into new UE device 110-1.

In response to receiving the indication of a request 508-2 for the delivery of a confirmation code, SM-DP+ 232 may respond with an error message 508-4 for having received, for example, a blank and/or static confirmation code. Error message 508-4 may cause LPA 214 to present an input screen to request the input of the confirmation code from user 102. For example, if new UE device 110-1 initially displayed screen 700 (see FIG. 7A), new UE device 110-1 may show user screen 704 subsequent to receiving error message 508-4. That is, rather than showing an error for the wrong confirmation code, new UE device 110-1 interprets error message 508-4 as an indication to prompt the user to enter the confirmation code (e.g., for the first time and/or without indicating that an "incorrect" confirmation code was received by SM platform 130). In other words, an incorrect confirmation code (e.g., a blank and/or predefined static confirmation code) may be used to indicate a request to resend the stored confirmation code, and the error message in response may be used to prompt the user to enter a confirmation code.

Process 400 continues with the input and receipt of the confirmation code (block 409). The user 102 may then enter the confirmation code into new UE device 110-1, as that confirmation number is seen on the display of old UE device 110-2. LPA 214 in new UE device 110-1 receives the confirmation code input by user 102. LPA 214 sends the confirmation code in a message 509-2 to SM-DP+ 232.

Process 400 continues with the provisioning of network elements within RAN 150 when the confirmation code is correct (block 410) (e.g., when the confirmation code entered by the user matches the stored confirmation code). When the confirmation code is correct, RSP platform 120 may provision for the profile associated with new UE device 110-1 to RAN 150 (block 411). SM-DP+ 232 sends a success notification 509-3-1 to RPS 206, which forwards a success notification 509-3-2 to EAS 208. EAS 208 may then send a request 509-3-3 to release the pending order to POS system 170. In addition, SM-DP+ 232 may send a success notification 509-4 to new UE device 110-1 indicating that LPA 214 may indicate to user 102 that the correct confirmation code was entered. POS system 170 may then send an order 510-2 to billing system 210 to release the pending customer provisioning. Billing system 210 then exchanges messages with RAN 150 (e.g., MTAS 216) for provisioning for new UE device 110. Likewise, MTAS 216 and network elements 218 exchange messages 510-3 for the network elements to provision for new UE device 110-1.

Process 400 continues with the downloading of the profile from SM platform 130 to new UE device 110-1 when the confirmation code is correct (block 411). LPA 214 in new UE device 110-1 may send a request 511-1 to SM-DP+ 232 to initiate an eSIM download. SM-DP+ 232 may respond by sending the eSIM download 511-2 to LPA 214 in new UE device 110-1. With the new eSIM download 511-2, LPA 214 may install the eSIM software components (e.g., profile) and initiate an attachment to RAN 150. In this embodiment, upon successful validation of the confirmation code, notification 509-3-1 is received by RSP platform 120 which is used to push the pending provisioning order for new UE device 110-1 (e.g., SIM 212). In this embodiment, the provisioning of network elements 218 may be completed while the profile is being downloaded, installed, enabled, before the installed-enabled eSIM attaches to the network. Upon network attach the provisioned eSIM will go through the over-the-air Activation process.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 4, and a series of signal flows and messages have been described with respect to FIGS. 5A-5C, the order of the blocks and/or signal flows may be modified in other implementations. Further, non-dependent blocks may be performed in parallel. In addition, as used here, SIM may include a physical SIM and/or an eSIM.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The terms "comprises" or "comprising," when used in this specification specify the presence of stated features, integers, steps or components but does not preclude the presence or addition of one or more other features, integers, steps, components or groups thereof.

The term "user" is intended to be broadly interpreted to include UE device 110 and/or a person using UE device 110. Also, the terms "user," "operator," "consumer," "account holder," "manager," "administrator," "subscriber," and/or "customer" are intended to be used interchangeably.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

The invention claimed is:

1. A network device comprising:
a transceiver to establish communication with a first user device; and
a processor, wherein the processor and transceiver are configured to:
receive, by a subscription management (SM) platform associated with a wireless network of a mobile network operator (MNO) from a first user device over a second network other than the wireless network, a message including the device ID, wherein the first user device does not include a subscriber identity mobile (SIM) profile associated with the wireless network of the MNO,
send, by the SM platform to the first user device over the second network, a confirmation code request message,
receive, by the SM platform from the first user device over the second network, a confirmation code response message indicative of a request to send a stored confirmation code to a second user device,
receive, by the SM platform from the first user device over the second network, a confirmation code entered by a user, and
send, by the SM platform to the first user device over the second network when the confirmation code entered by the user matches the stored confirmation code, the SIM profile associated with the device ID for provisioning the wireless network of the MNO.

2. The network device of claim 1, wherein the processor and transceiver are configured to:
send the stored confirmation code to the second user device for display to the user.

3. The network device of claim 2, wherein the confirmation code response indicative of the request to send the stored confirmation code to a second user device includes a blank or predefined confirmation code.

4. The network device of claim 3, wherein the processor is configured to suppress counting the blank or predefined confirmation code as an incorrect confirmation code entered by the user.

5. The network device of claim 2, wherein the confirmation code response message indicative of the request to send the stored confirmation code to the second user device does not include the stored confirmation code.

6. The network device of claim 2, wherein the processor and transceiver are further configured to:
send, by the SM platform to the first user device over the second network, an error message indicating that the confirmation code is incorrect,
wherein the first user device is configured to prompt, in response to the error message, the user to enter the confirmation code without indicating that an incorrect confirmation code was received by the SM platform.

7. The network device of claim 2,
wherein the confirmation code response message indicative of the request to send the stored confirmation code to the second user device includes a message sent from the first user device to the SM platform through an ES9+ interface.

8. A method comprising:
receiving, by a subscription management (SM) platform associated with a wireless network of a mobile network operator (MNO) from a first user device over a second network other than the wireless network of the MNO, a message including the device identifier (ID), wherein the first user device does not include a subscriber identity mobile (SIM) profile activated to provision the wireless network of the MNO;
sending, by the SM platform to the first user device over the second network, a confirmation code request message;
receiving, by the SM platform from the first user device over the second network, a confirmation code response message indicative of a request to send a stored confirmation code to a second user device;
receiving, by the SM platform over the second network, a confirmation code entered by a user; and sending, by the SM platform to the first user device over the second network, the SIM profile associated with the device ID to activate for provisioning the wireless network of the MNO.

9. The method of claim 8, further comprising:
sending the stored confirmation code to the second user device.

10. The method of claim 9,
wherein the confirmation code response message indicative of the request to send the stored confirmation code to the second user device includes a message sent from the first user device to the SM platform through an ES9+ interface.

11. The method of claim 9, wherein the confirmation code response message indicative of the request to send the stored confirmation code to the second user device does not include the stored confirmation code.

12. The method of claim 9, wherein the confirmation code response indicative of the request to send the stored confirmation code to a second user device includes a blank confirmation code.

13. The method of claim 12, further comprising:
suppressing counting the blank confirmation code as an incorrect confirmation code entered by the user.

14. The method of claim 9, further comprising:
sending, by the SM platform to the first user device over the second network, an error message indicating that the confirmation code was incorrect,
wherein the first user device is configured to prompt, in response to the error message, the user to enter the confirmation code without indicating that an incorrect confirmation code was received by the SM platform.

15. A user device comprising:
a transceiver for communicating with a wireless network of a mobile network operator (MNO) and for communicating with a second network other than the wireless network of the MNO; and
a processor to:
determine that the user device does not include a subscriber identity module (SIM) profile activated to provision the wireless network of the MNO,
wherein the transceiver is configured to:
connect to the second network to enable communication with a subscription management (SM) platform,
transmit, over the second network, a message including the device ID to the SM platform,
receive, over the second network, a confirmation code request message from the SM platform,
transmit, over the second network, a confirmation code response message indicative of a request to send a stored confirmation code to another user device,
receive a confirmation code input by a user and transmit, over the second network, the received confirmation code to the SM platform, and
receive, over the second network, the SIM profile associated with the device ID to activate for provisioning the wireless network of the MNO.

16. The user device of claim 15,
wherein the confirmation code response message indicative of the request to send the stored confirmation code to the second user device includes a message sent from the user device to the SM platform through an ES9+ interface.

17. The user device of claim 15, wherein the confirmation code response message indicative of the request to send the stored confirmation code to the second user device does not include the stored confirmation code.

18. The user device of claim 15, wherein the confirmation code response indicative of the request to send the stored confirmation code to a second user device includes a blank or predefined confirmation code.

19. The user device of claim 18,
wherein the blank or predefined confirmation code is not counted as an incorrect confirmation code entered by the user.

20. The user device of claim 15,
wherein the transceiver is configured to receive, over the second network, a message indicating that the confirmation code was incorrect, and
wherein the processor is configured to prompt the user to enter the confirmation code without indicating that an incorrect confirmation code received by the user device from the user.

* * * * *